No. 715,929. Patented Dec. 16, 1902.
E. ZEDLITZ.
POISON DISTRIBUTER FOR GROWING PLANTS.
(Application filed Mar. 18, 1902.)
(No Model.) 4 Sheets—Sheet 1.
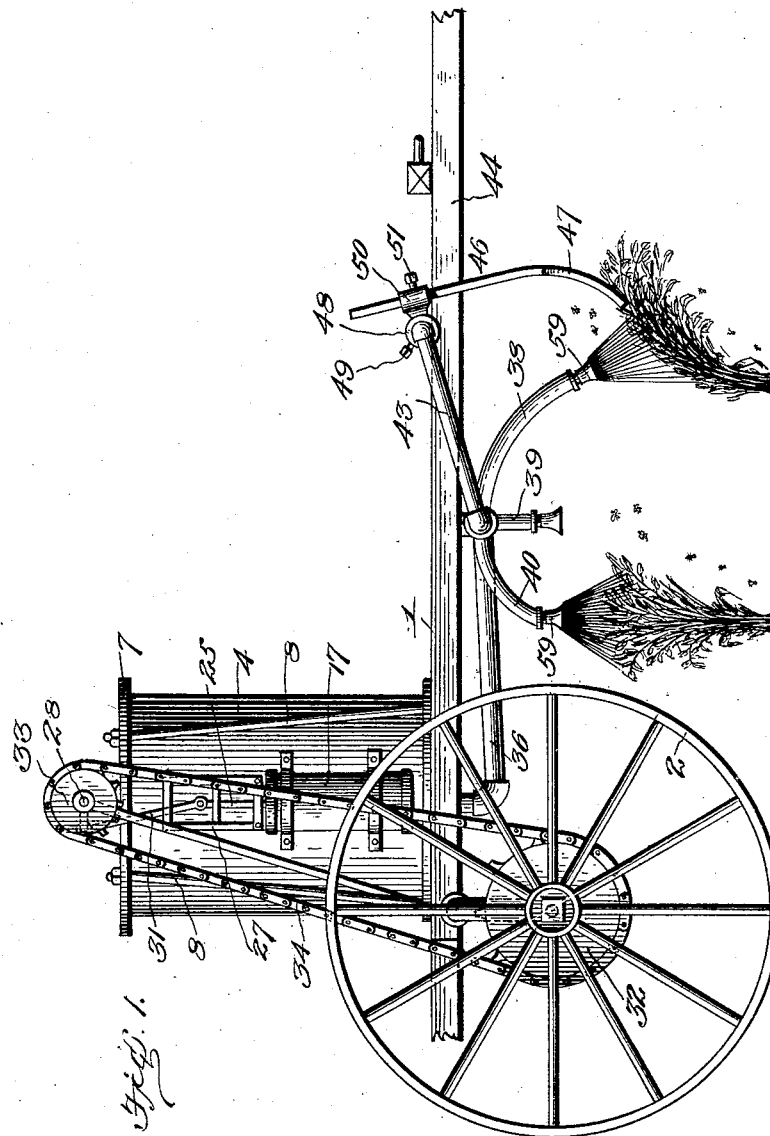

No. 715,929. Patented Dec. 16, 1902.
E. ZEDLITZ.
POISON DISTRIBUTER FOR GROWING PLANTS.
(Application filed Mar. 18, 1902.)
(No Model.) 4 Sheets—Sheet 2.
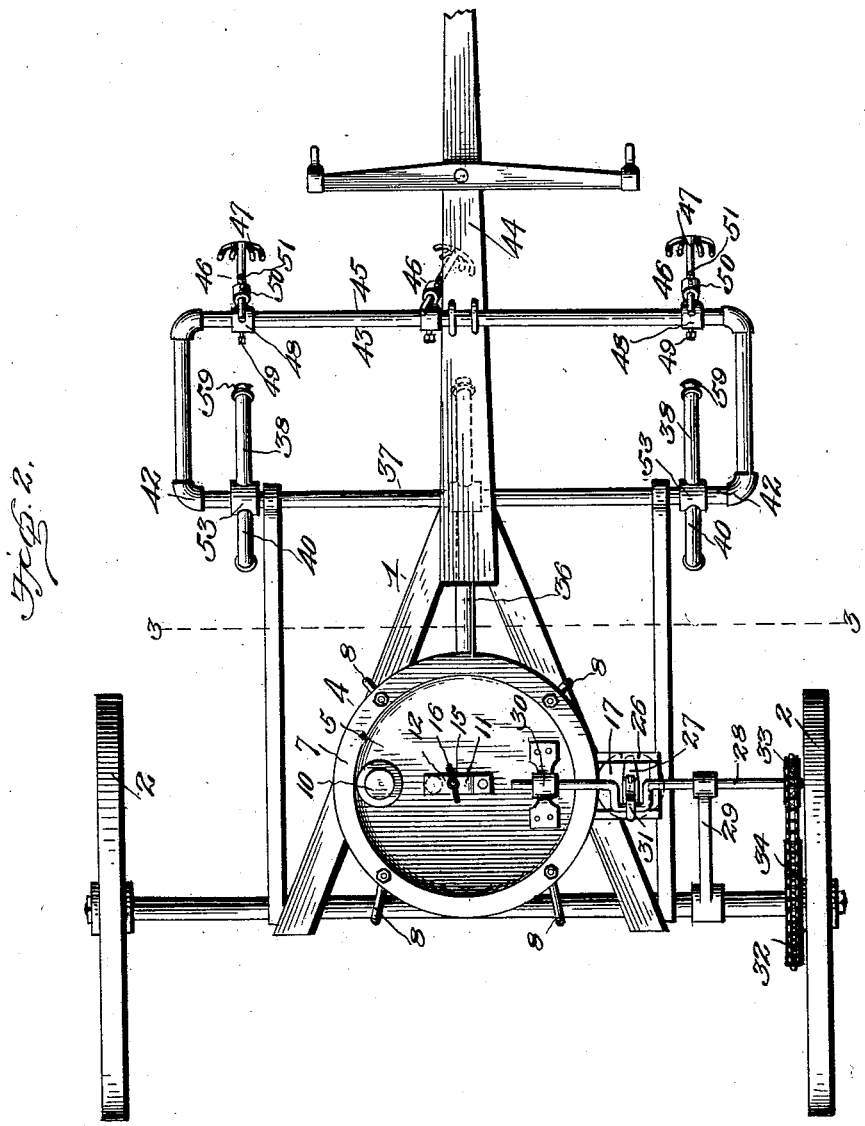
Inventor
Edward Zedlitz
Witnesses
By H. B. Wilson & Co.
Attorneys No. 715,929. Patented Dec. 16, 1902.
E. ZEDLITZ.
POISON DISTRIBUTER FOR GROWING PLANTS.
(Application filed Mar. 18, 1902.)
(No Model.) 4 Sheets—Sheet 3.
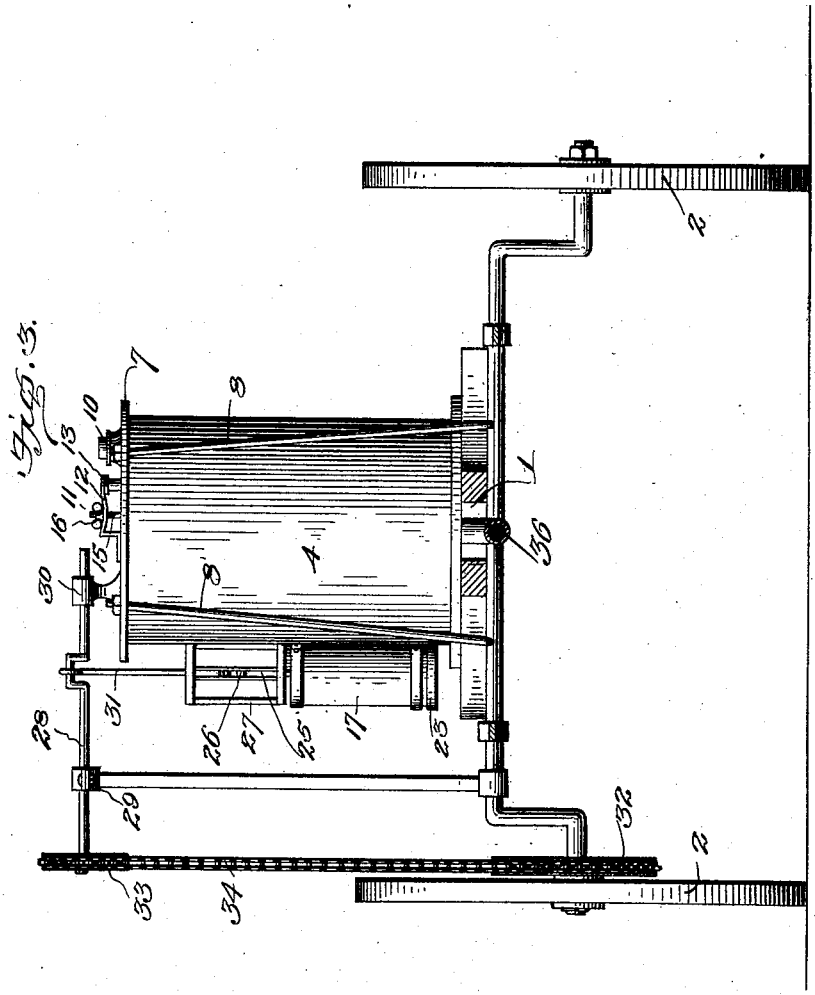
Witnesses
Inventor
Edward Zedlitz
By H. B. Willson & Co.
Attorneys No. 715,929. Patented Dec. 16, 1902.
E. ZEDLITZ.
POISON DISTRIBUTER FOR GROWING PLANTS.
(Application filed Mar. 18, 1902.)
(No Model.) 4 Sheets—Sheet 4.
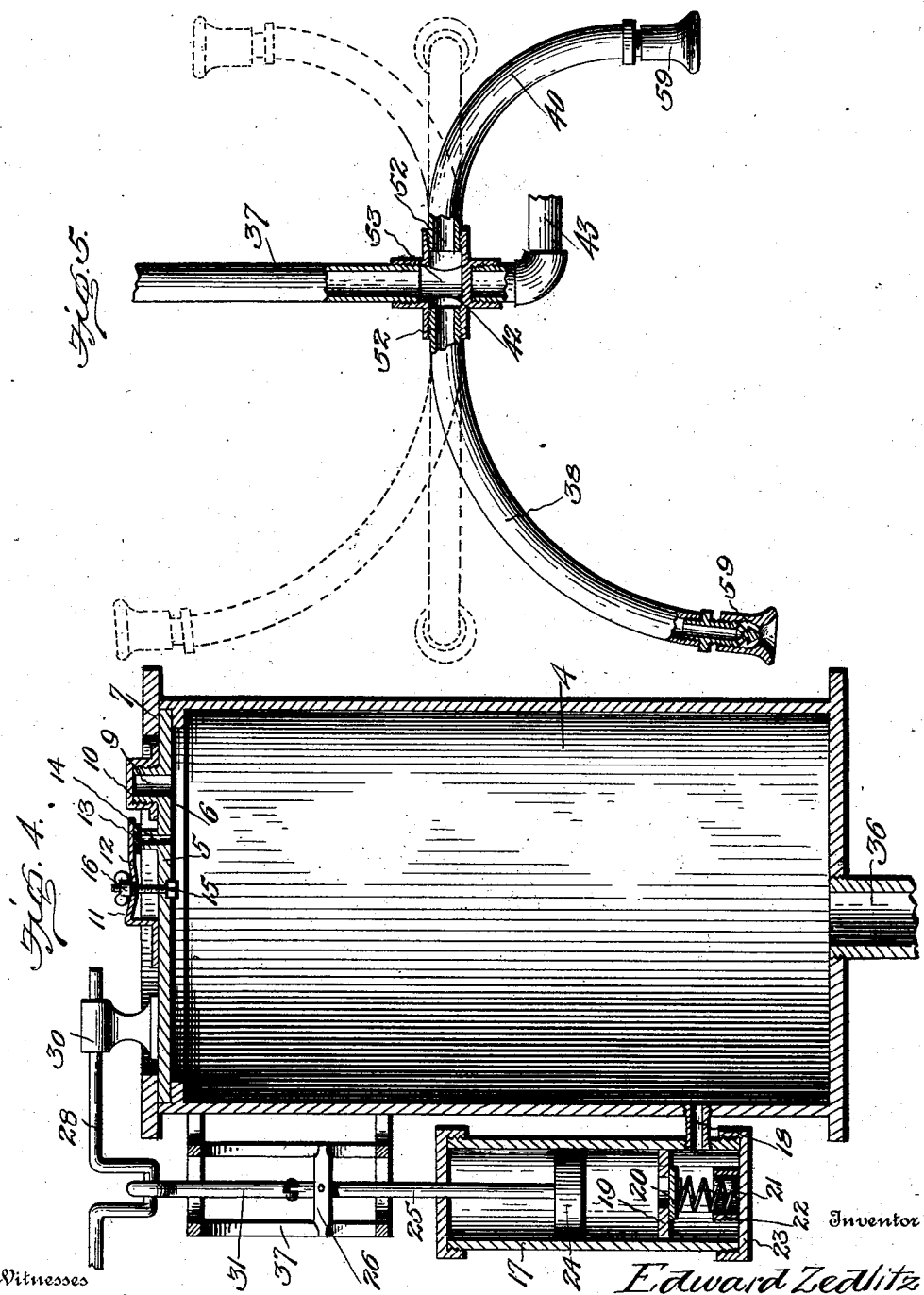

UNITED STATES PATENT OFFICE.

EDWARD ZEDLITZ, OF PAIGE, TEXAS.

POISON-DISTRIBUTER FOR GROWING PLANTS.

SPECIFICATION forming part of Letters Patent No. 715,929, dated December 16, 1902.

Application filed March 18, 1902. Serial No. 98,816. (No model.)

*To all whom it may concern:*

Be it known that I, EDWARD ZEDLITZ, a citizen of the United States, residing at Paige, in the county of Bastrop and State of Texas, have invented certain new and useful Improvements in Poison-Distributers for Growing Plants; and I do declare the following to be a full, clear, and exact description of the invention, such as will enable others skilled in the art to which it appertains to make and use the same.

The invention relates to poison-distributers for growing plants for thoroughly and expeditiously sprinkling the same with poison in a powdered form or solution to kill and drive off worms, insects, and other destructive agents which so disastrously strike the plants.

The object of the invention is to provide a machine of this character readily adaptable for connection to the frame of an ordinary cultivator and provided with means which as the machine is drawn along bends the plants, so that the powder or solution may be injected under the plant and close to the roots, and after that has been done and the plant rights itself provision is made for injecting the poisonous compound downwardly and on top of the plant, thus thoroughly powdering or sprinkling the plant with the poison.

With these and other objects in view the invention consists of certain novel features of construction, combination, and arrangement of parts, which will be hereinafter more fully described, and particularly pointed out in the appended claims.

Figure 1 is a side elevation of the improved poison-distributer, showing it attached to the frame of an ordinary cultivator. Fig. 2 is a top plan view. Fig. 3 is a sectional view on dotted lines 3 3 of Fig. 2. Fig. 4 is a vertical sectional view through the powder container or tank, and Fig. 5 is a detail view of the discharge-nozzle.

Referring to the drawings, 1 denotes the main supporting-frame, which may be that of an ordinary cultivator and is provided with supporting-wheels 2.

4 denotes the powder-container, which preferably consists of a tank which is provided with a removable cover 5. This cover rests upon an annular shoulder 6, secured within the tank, and is held in place by a ring 7, through which pass the upper ends of hook-rods 8, the lower ends of said rods being hooked to the main frame of the cultivator and the upper ends of said rods being provided with tightening-nuts, whereby the ring 7 is caused to firmly clamp the cover and hold it in position. This cover is provided with a filling-orifice 9, covered by a cap 10, and is provided with a safety-valve 11, which may be of any well-known or approved construction, but which in the present instance consists of a spring 12, having one end secured to the cover and the other end provided with a flexible or rubber pad 13, resting upon and closing the escape-aperture 14. A screw 15, provided with a tightening-nut 16, is employed for regulating the tension of the spring.

17 denotes a pump-cylinder connected to the poison-container and communicating therewith through the short pipe 18 near the lower end of the poison-container. At a point above the point of communication of said cylinder with the poison-container is provided a valve-seat 19, with which engages a check-valve 20, which is held to said seat by a coiled spring 21, the lower end of which engages a seat 22, carried by the removable cap 23 of the lower cylinder-head. The energy of this spring is exerted to hold the valve to its seat.

24 denotes the pump-plunger, and 25 the plunger-rod, which is provided with a cross-head 26, which moves between guides 27.

28 denotes a crank-shaft which is journaled in bearings 29 and 30, the former projecting upwardly from the axle and the latter being secured to the cover of the poison-container.

31 denotes a link connecting the crank-shaft to the plunger-rod 25. This crank-shaft may be rotated in any suitable manner from the supporting-wheels of the cultivator-frame; but, as shown and preferred, I fix to one of the supporting-wheels a sprocket-wheel 32 and to the crank-shaft a similar wheel 33, of less diameter, and connect the two wheels by a sprocket-chain 34. It will therefore be observed that as the machine is drawn along air will be compressed within the poison-container until the pressure therein is greater than the tension at which the spring of the safety-valve is set, and when the pressure reaches this point the safety-valve will open to allow the escape of air in the usual manner.

36 denotes a discharge-pipe leading from the bottom of the poison-container to a cross-pipe 37, which is provided with a series of forwardly and downwardly projecting discharge-nipples 38, downwardly-projecting discharge-nipples 39, and downwardly and rearwardly projecting discharge-nipples 40. The cross-pipe 37 is closed at its ends 42 and is connected with the tubular frame 43, secured to the tongue or pole 44 of the supporting-frame, and to the cross-piece 45 of the tubular frame are connected plant-bending devices 46, which project downwardly and have their lower ends bent slightly rearward and provided with brush-heads 47. These bending devices are connected to the said tubular frame, so that they may be vertically adjusted to accommodate plants of different heights and may also be adjusted to adapt them to rows of different widths. This connection is preferably effected by bracket-heads 48, which are secured to the cross-piece 45 of the tubular frame by set-screws 49 and are provided with perforated lugs 50, through which the stems of the plant-benders project and are held in vertical adjustment by the set-screws 51. The sprayer-nipples, particularly the ones at the outer ends of the tube 37, are laterally adjustable to adapt the machine to spray all plants in rows of different widths. This adjustment is effected by connecting the screw-threaded ends 52 of each of the three nipples at each end of the pipe 37 to a union 53, and these nipples being curved longitudinally will, when turned either to the right or to the left, vary the distance between themselves and the intermediate set of nipples under the tongue or pole of the wheeled supporting-frame. The nipples may be provided with an adjustable nipple 59 to regulate and control the discharge of poison-powder.

In operation as the machine is drawn along air will be forced into the poison-containing tank, in which has been previously placed the proper amount of poison-powder, and this air being compressed within said tank and entering it below the surface of said powder tends to create a commotion or stirring action within said powder and forces the same through the pipe 36 into the cross-pipe 35 in a finely divided or comminuted condition. As shown in Fig. 1, one of the benders is in engagement with one plant and is bending said plant in the direction of movement of the machine, and from the sprayer-nipple the powder is discharging upon the stem and under side of the leaves of the plant. As the bender frees itself from engagement with the plant and the plant rights itself, as shown in Fig. 1, (left-hand plant,) the nipples 39 and 40 will spray the poison-powder directly upon the top and among the leaves of said plant. It will thus be observed that the leaves are sprayed underneath by the nipple 38 and on top and along the sides by the nipples 39 and 40, the nipple 39 forcing the powder directly downwardly into the center of the plant, while the nipple 40, being curved slightly rearwardly, tends to spray the powder in a more diffused condition. It will thus be seen that the plants will be thoroughly supplied with the poison and that owing to the lateral adjustability of the outer sprayer-nipples and the plant-benders the machine is adapted to spray rows of plants of different widths, and owing to the vertical adjustability of the benders plants of different growths or heights may be sprayed. Should more air be compressed within the powder-container than is required, and which would endanger the construction, the escape-valve automatically opens to diminish the pressure.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with the supporting-frame, of a poison-container mounted thereon, discharge-nipples communicating with the poison-container, one projecting forwardly and downwardly, another downwardly, and another rearwardly and downwardly, whereby as a plant is engaged by the benders and bent forwardly, the forwardly and downwardly projecting nipples will discharge the poison upon the stalk and under sides of the leaves of the plant, and as the machine continues on its course and the plant rights itself, the remaining nipples will discharge the poison upon the top of the plant, and benders arranged in advance of the discharge-nipples, substantially as set forth.

2. A poison-distributer, consisting of a suitable supporting-frame, a bender for bending the plants, a discharge-nipple arranged to discharge the poison on the plants in their bended position, and a nipple arranged to discharge the poison on the plants after they have been freed by the benders and permitted to stand erect, substantially as set forth.

3. In a poison-distributer, the combination with a suitable supporting-frame, of poison-distributing nipples, and benders arranged in advance of the poison-distributing nipples and curved downwardly and rearwardly and provided with sprayer-heads, substantially as set forth.

In testimony whereof I have hereunto set my hand in presence of two subscribing witnesses.

EDWARD ZEDLITZ.

Witnesses:
JNO. C. PENN,
OSCAR FRINK.